Patented June 4, 1940

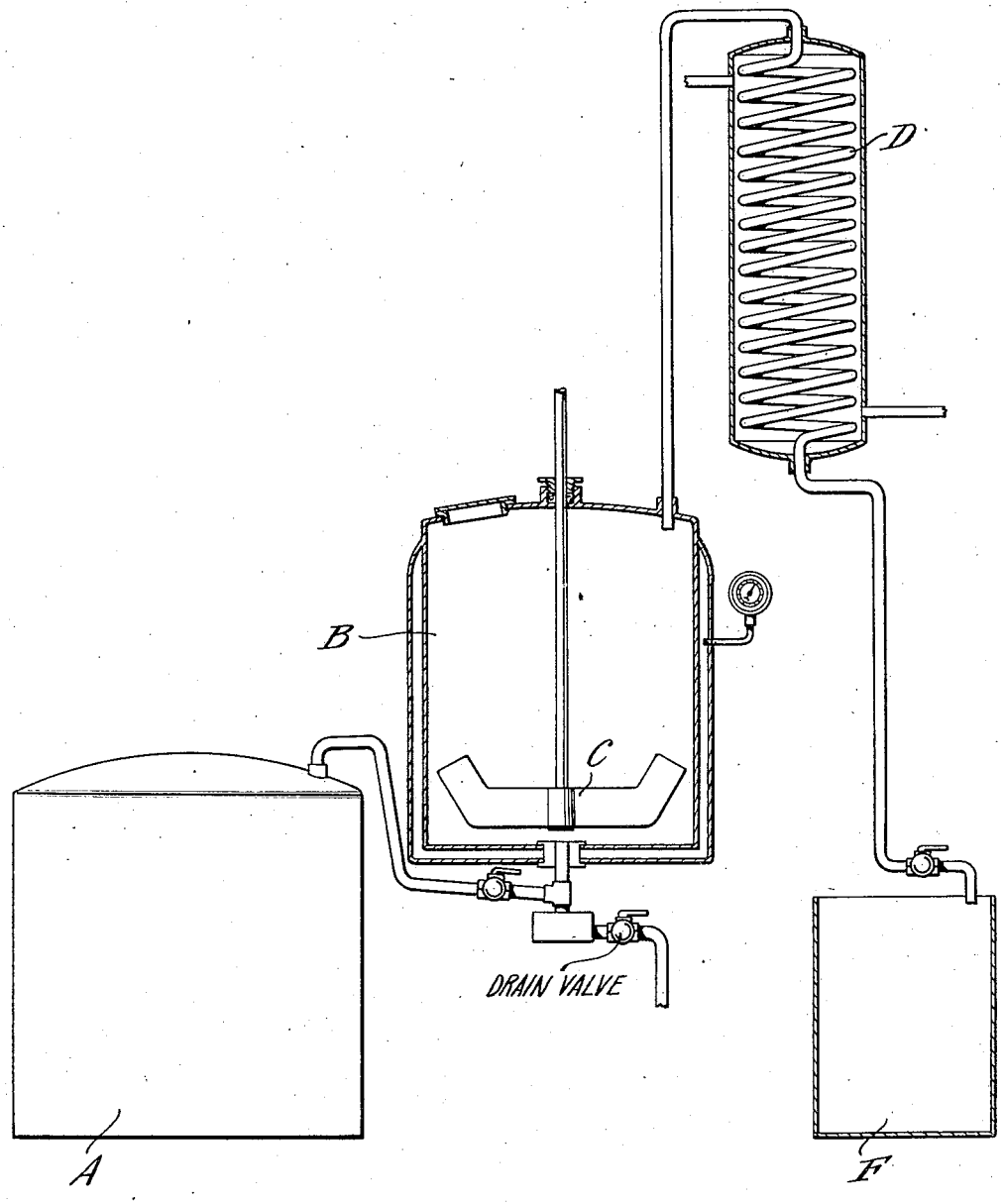

2,202,934

UNITED STATES PATENT OFFICE 2,202,934

PRODUCTION OF ALIPHATIC KETONE-DIARYLAMINE ANTIOXIDANTS

William F. Tuley, Naugatuck, Charles S. Dewey, Cheshire, and Roy S. Hanslick, Naugatuck, Conn., assignors, by mesne assignments, to United States Rubber Company, New York, N. Y., a corporation of New Jersey Application December 9, 1937, Serial No. 178,900

16 Claims. (Cl. 260—65)

This invention relates to improvements in the production of aliphatic ketone-diarylamine antioxidants, and more particularly to a method of making and the use of the resulting solid condensation products thereof.

It is known that the properties of aliphatic ketone-diarylamine condensation products which are composite complex chemicals varying in constitution and proportion of components, are more or less dependent on the process of preparation. Materials heretofore prepared have been free flowing liquids and have required the use of high temperatures and pressures to bring about the reaction.

An object of the present invention is to provide a process of making an improved solid type of product which is substantially non-caking and therefore having less tendency to set to a solid cake in the package or container offered to the trade. A further object is to provide such a product which in addition has outstanding antioxidant characteristics. Another object is to provide a process whereby to simplify the operations, allow for obtaining a higher conversion of the diarylamine during the original reaction, all without the necessity of using high pressures and high temperatures. A still further object is to provide a process of producing solid, resinous easily pulverizable aliphatic ketone-diarylamine products in which there may be ninety-five or more percent conversion of the diarylamine, whereby to provide products having improved age-resister properties. Other objects will be apparent from the following description.

The invention broadly comprises passing aliphatic ketone in vapor form into liquified diarylamine and reacting the two materials under conditions whereby a high degree of conversion of the diarylamine is obtained. The extent of the reaction and nature of the composite product is governed by the temperatures employed, the kind of catalyst of reaction used, and whether the reaction or conversion apparatus is composed of materials inert to the reaction, it having been observed that metallic equipment containing iron or lead is conductive to softer and inferior products. Of the various known catalysts of condensation between aliphatic ketones and diarylamines that may be used, the halogen-containing catalysts, especially the non-metallic halogen-containing catalysts, e. g. iodine, bromine, hydriodic acid, hydrobromic acid, and hydrochloric acid, appear to work better in the present process, especially with halogen-resisting equipment, and that for some reason the hydrohalogen acids such as hydriodic acid, are more active catalysts and give markedly better products. The proportion of halogen catalyst is preferably 1.5 to 3.0 parts by weight to 100 parts of the diarylamine.

The temperatures employed are in the range between 100° C. and about 200° C., the more solid products being obtained when employing temperatures from about 140° C. to about 160° C. At temperatures of reaction above 170° C. there arises loss of catalyst, loss of diarylamine, and softer products. At temperatures below 140° C. there is a slower conversion of the diarylamine resulting in soft reaction products containing much unreacted amine. The latter may be separated by distillation from the reaction product.

In a preferred form of the invention and referring to the drawing, the condensation products are made by generating or vaporizing the ketone, e. g. acetone, in an autoclave A, to form acetone vapor and passing it through the bottom of a vitreous- or glass-lined steam-jacketed reactor B equipped with a stirrer C containing the molten diarylamine mixed with the dehydration catalyst. To the reactor is attached a water cooled condenser D, so positioned as to condense but not return to the reactor any unreacted acetone and low boiling constituents such as water formed during the reaction (collectable at F). It will be thus apparent that acetone vapor is forced into the mixture of the diarylamine and catalyst, unreacted acetone and the water formed by the reaction passing from the reaction zone as vapor into the water cooled condenser. After the condensation is complete the reaction mixture is allowed to cool partially and is kept fluid to facilitate easy washing with caustic soda solution or equivalent alkali, to remove acidity which may be due in part to the acidic catalyst. When cold, the reaction product is quite hard and is ground and washed with water until free of any residual alkali, after which it is finally dried.

The following examples are given to further illustrate the invention, the parts being by weight:

*Example 1.*—A mixture of 225 lbs. diphenylamine and 14.5 lbs. hydriodic acid (47% HI) is heated to about 140° C. Acetone vapor is then slowly and continuously introduced by pressure into the reaction vessel. The temperature of the reaction mixture is kept at about 140° C. for about an hour and then is raised to about 150–155° C. and the rate of acetone vapor inflow increased. The unreacted acetone and water formed during the reaction is collected from the condenser. The addition of acetone vapor is continued until the specific gravity of the acetone-water condensate has decreased to about 0.800 at 20-25° C. or substantially the specific gravity of dry acetone. The inflow of acetone vapor is then stopped, the ratio of acetone that has reacted with the amine being about 1.1 moles of acetone to one mole of amine. The reaction mixture is allowed to cool partially, during which time most of the unreacted acetone present is distilled out of the reaction vessel. The reaction mixture is kept fluid to facilitate washing with sufficient of a 50 percent solution of caustic soda to neutralize and free the mixture of the acid catalyst and/or other halogen bodies. After cooling, the hard resinous product is ground and washed with water until substantially free of any residual alkali, and finally dried to form a pulverulent light yellow solid. The diphenylamine has been at least about 95% converted.

*Example 2.*—A mixture of 200 lbs. phenyl beta-naphthylamine and 8.5 lbs. hydriodic acid (47% HI) is heated to about 140° C. Acetone vapor is then slowly and continuously introduced by pressure into the reaction vessel. The temperature of the reaction mixture is kept at about 140° C. for about an hour, then the temperature is raised to about 145° C. and the rate of acetone vapor inflow increased. The unreacted acetone and water formed during the reaction is collected from the condenser. The addition of acetone vapor is continued until the specific gravity of the acetone-water condensate has decreased to about 0.800 at 20-25° C. or substantially the specific gravity of dry acetone. The inflow of acetone vapor is then stopped, the ratio of acetone that reacted with the amine being about 1.1 moles of acetone to one (1.0) mole of amine. The reaction mixture is allowed to cool partially, during which time most of the unreacted acetone present is distilled out of the reaction vessel. The reaction mixture is kept fluid to facilitate washing with sufficient of a 50 per cent solution of caustic soda to neutralize and free the mixture of the acid catalyst and/or other halogen bodies. After cooling, the hard resinous product is ground and washed with water until substantially free of any residual alkali, and finally dried to form a pulverulent light yellow solid. The phenyl beta-naphthylamine is at least about 95 per cent converted.

As an alternative a portion of the diarylamine can be reacted with the hydriodic acid and the resulting amine hydriodide dried before adding it to the reaction vessel.

The process may be modified by employing other aliphatic ketones, for example, ethyl methyl ketone, diethyl ketone, mesityl oxide, phorone, dimethyl ketone, dipropyl ketone, dibutyl ketone, etc. and in place of diphenylamine or phenyl beta naphthylamine, for reacting with any of the ketones, other diarylamines may be employed, for example, N,N'-diphenyl p-phenylene diamine, ditolylamine, dixylylamine, phenyl tolylamine, dinaphthylamine, phenyl alpha-naphthylamine, etc. In general, for every molecular proportion of the diarylamine there should be reacted at least one molecular proportion of the aliphatic ketone.

The composite products may be employed for preserving and protecting rubber, unvulcanized or vulcanized, and similar oxidizable materials which tend to deteriorate by absorption of oxygen from the air, for example, goods of rubber or allied gums, unsaturated fatty oils such as unsaturated vegetable oils, essential oils, petroleum oils and their derivatives including cracked gasolines, soaps, aldehydes, synthetic resins, and the like,—by incorporation of amounts ranging from 0.1% to 5% by weight. They are particularly useful in retarding the deterioration of vulcanized rubber goods, having good anti-flex-cracking properties in articles such as rubber tires which undergo repeated strains during use.

The following table shows the comparative antioxidant values of the acetone-diphenylamine and acetone-phenyl beta-naphthylamine antioxidants produced herein under Example 2, after incorporation in control mix A, and testing of the various stocks after vulcanization for various periods of time at 30 pounds per sq. inch steam pressure, the parts being by weight:

| Stock | A | B | C |
|---|---|---|---|
| Smoked sheets | 100 | 100 | 100 |
| Carbon black | 45 | 45 | 45 |
| Zinc oxide | 5 | 5 | 5 |
| Pine tar | 3.5 | 3.5 | 3.5 |
| Zinc soap of coconut oil acids | 3.5 | 3.5 | 3.5 |
| Sulfur | 3.0 | 3.0 | 3.0 |
| Mercaptobenzothiazole | 1.0 | 1.0 | 1.0 |
| Acetone-diphenylamine antioxidant | | 1.0 | |
| Acetone-phenyl beta naphthylamine antioxidant | | | 1.0 |

| Cure | | Ultimate tensiles and elongations | | | |
|---|---|---|---|---|---|
| | | A | B | A | C |
| Unaged | 45 minutes | 4300—730 | 4120—700 | | |
| | 60 minutes | 4240—643 | 4300—700 | | |
| | 75 minutes | 4400—666 | 4300—666 | | |
| | 90 minutes | 4240—633 | 4000—646 | | |
| | 45 minutes | | | 4050—680 | 4140—696 |
| | 60 minutes | | | 4120—696 | 4000—686 |
| | 75 minutes | | | 3980—636 | 4130—650 |
| | 90 minutes | | | 4120—630 | 4120—650 |
| Aged 96 hrs. in oxygen | 45 minutes | 640—410 | 2400—673 | | |
| | 60 minutes | 500—340 | 2270—608 | | |
| | 75 minutes | 500—323 | 2260—543 | | |
| | 90 minutes | 530—326 | 2030—510 | | |
| | 45 minutes | | | 2240—286 | 3400—480 |
| | 60 minutes | | | 2200—276 | 3300—430 |
| | 75 minutes | | | 1790—223 | 3180—426 |
| | 90 minutes | | | 1580—213 | 2840—386 |
| Aged 90 hrs. in oven (212° F.) | 45 minutes | 1600—240 | 3200—456 | | |
| | 60 minutes | 1550—250 | 2940—433 | | |
| | 75 minutes | 1500—260 | 2650—390 | | |
| | 90 minutes | 1400—233 | 2200—323 | | |
| | 45 minutes | | | 2240—286 | 3400—480 |
| | 60 minutes | | | 2200—276 | 3300—430 |
| | 75 minutes | | | 1780—223 | 3180—426 |
| | 90 minutes | | | 1580—213 | 2840—386 |

*Flex-cracking (total) (De Mattia)*

| | A | B | A | C |
|---|---|---|---|---|
| Unaged | 1590 | 2200 | | |
| Aged 48 hrs. in oxygen | 500 | 1175 | | |
| Aged 24 hrs. in oven (212° F.) | 550 | 930 | | |
| Unaged | | | 1640 | 1910 |
| Aged 48 hrs. in oxygen | | | 610 | 935 |
| Aged 24 hrs. in oven (212° F.) | | | 500 | 975 |

The term "rubber" is used broadly to include caoutchouc, balata, gutta percha, and similar vulcanizable gums, as well as synthetic rubbers, rubber isomers, reclaimed rubber, etc., and natural or artificially-prepared latices, compounded or not with fillers, accelerators, softeners, etc.

Having thus described our invention, what we claim and desire to protect by Letters Patent is:

1. A process of making improved aliphatic ketone-diarylamine antioxidants which comprises passing an aliphatic ketone in vapor form into a liquid mass of a diarylamine while heating the mix to a temperature between about 140° C. and about 170° C., and during the reaction between the aliphatic ketone and diarylamine, separating and recovering unreacted ketone and water of condensation which passes from the reaction zone as a vapor.

2. A process of making improved aliphatic ketone-diarylamine antioxidants which comprises reacting a diarylamine while in liquid form with an aliphatic ketone introduced in vapor form by pressure into the liquid diarylamine while heating the reaction mix in the presence of an acidic condensation catalyst, to a temperature between about 140° C. and about 170° C., and during the reaction between the aliphatic ketone and diarylamine, separating and recovering unreacted ketone and water of condensation both of which pass from the reaction zone as a vapor.

3. A process of making improved aliphatic ketone-diarylamine antioxidants which comprises reacting a diarylamine while in liquid form with an aliphatic ketone introduced in vapor form by pressure into the liquid diarylamine while heating the reaction mix in the presence of a halogen-containing catalyst, to a temperature between about 140° C. and about 170° C., and during the reaction between the aliphatic ketone and diarylamine, separating and recovering unreacted ketone and water of condensation both of which pass from the reaction zone as a vapor.

4. A process of making improved aliphatic ketone-diarylamine antioxidants which comprises passing an aliphatic ketone in vapor form into a liquid mass of a diarylamine while heating the mix to a temperature between about 140° C. and about 170° C., in the presence of a catalyst, and during the reaction between the aliphatic ketone and diarylamine, separating and recovering unreacted ketone and water of condensation which passes from the reaction zone as a vapor, substantially freeing the reaction mass of catalyst and any unreacted starting materials, and recovering a solid resinous product.

5. A process which comprises forcing a dialkyl ketone in the form of vapor into a molten diarylamine compound, reacting between about 140° C. and about 170° C. said ketone and said amine with liberation of water, and while continuing the passage of the dialkyl ketone vapor into the reaction mix, separately condensing the unreacted ketone and water vapor evolved from the reaction mix until substantial completion of the reaction between the dialkyl ketone and the diarylamine, washing the reaction product while fluid with alkali, allowing the reaction product to set to a hard resinous mass, and pulverizing the resinous product.

6. A process which comprises forcing a dialkyl ketone in the form of vapor into a molten diarylamine compound, reacting between about 140° C. and about 170° C. said ketone and said amine with liberation of water, and while continuing the passage of the dialkyl ketone vapor into the reaction mix, separately condensing the unreacted ketone and water vapor evolved from the reaction mix until substantial completion of the reaction between the dialkyl ketone and the diarylamine, washing the reaction product while fluid with alkali, allowing the reaction product to set to a hard resinous mass, pulverizing the resinous product, and washing the pulverent material until substantially free of residual alkali.

7. A process of producing an improved aliphatic ketone-diarylamine antioxidant which comprises reacting a diarylamine compound while in liquid form with an aliphatic ketone introduced in vapor form by pressure into the liquefied diarylamine compound while heating the reaction mix to a temperature between about 140° C. and about 170° C., in the presence of a halogen-containing catalyst with elimination of water of condensation, substantially freeing the reaction mass of any unreacted starting materials, and recovering a purified solid resinous reaction product which may be easily pulverized to a substantially non-caking condition.

8. An improved aliphatic ketone-diarylamine antioxidant resulting from a process as set forth in claim 7.

9. A process of producing an improved dialkyl ketone-diarylamine antioxidant which comprises reacting a diarylamine compound while in liquid form with a dialkyl ketone introduced in vapor form by pressure into the liquefied diarylamine compound while heating the reaction mix to a temperature in the range from about 140° C. to about 170° C., in the presence of a halogen-containing catalyst with elimination of water of condensation, substantially freeing the reaction mass of any unreacted starting materials, and recovering a purified solid resinous reaction product which may be easily pulverized to a substantially non-caking condition.

10. An improved dialkyl ketone-diarylamine antioxidant resulting from a process as set forth in claim 9.

11. A process of producing an improved acetone-diphenylamine antioxidant which comprises reacting diphenylamine compound while in liquid form with acetone introduced in vapor form by pressure into the liquefied diphenylamine compound while heating the reaction mix to a temperature in the range from about 140° C. to about 170° C., in the presence of a halogen-containing catalyst with elimination of water of condensation, substantially freeing the reaction mass of catalyst and any unreacted starting materials, and recovering a purified solid resinous reaction product which may be easily pulverized to a substantially non-caking condition.

12. An improved acetone-diphenylamine antioxidant resulting from a process as set forth in claim 11, and characterized in being a yellowish pulverulent resinous solid containing not in excess of about 5% free diphenylamine.

13. A process of producing an improved acetone-phenyl beta naphthylamine antioxidant which comprises reacting phenyl beta naphthylamine while in liquid form with acetone introduced in vapor form by pressure into the liquefied phenyl beta naphthylamine compound while heating the reaction mix to a temperature in the range from about 140° C. to about 160° C., in the presence of a halogen-containing catalyst with elimination of water of condensation, substantially freeing the reaction mass of catalyst and any unreacted starting materials, and recovering a purified solid resinous reaction product which may be easily pulverized to a substantially non-caking condition.

14. An improved acetone-phenyl beta naphthylamine antioxidant resulting from the process set forth in claim 13, and characterized in being a yellowish pulverulent resinous solid containing not in excess of about 5% free phenyl beta-naphthylamine.

15. A process of producing a solid acetone-diarylamine antioxidant which comprises preparing a bath of molten diarylamine containing hydriodic acid as a catalyst for the reaction, generating acetone vapor at a point removed from the reacting zone, leading and introducing the acetone vapor by pressure into the molten diarylamine mass, reacting the acetone and diarylamine at a temperature between about 140° C. and about 170° C. with liberation of water, and while continuing the passage of the acetone vapor into the reaction mix condensing and collecting the unreacted acetone and water vapor evolved from the reaction zone until the substantial completion of the reaction between the acetone and diarylamine.

16. A process of producing a solid acetone-diarylamine antioxidant which comprises preparing a bath of molten diarylamine containing hydriodic acid as a catalyst for the reaction, generating acetone vapor at a point removed from the reacting zone, leading and introducing the acetone vapor by pressure into the molten diarylamine mass, reacting the acetone and diarylamine at a temperature between about 140° C. and about 170° C. with liberation of water, and while continuing the passage of the acetone vapor into the reaction mix condensing and collecting the unreacted acetone and water vapor evolved from the reaction zone until the substantial completion of the reaction between the acetone and diarylamine, and subsequently washing the reaction product with alkali and water.

WILLIAM F. TULEY.
CHARLES S. DEWEY.
ROY S. HANSLICK.